US011219309B2

(12) United States Patent
Lo et al.

(10) Patent No.: US 11,219,309 B2
(45) Date of Patent: Jan. 11, 2022

(54) SMART LIQUOR CABINET AND MANAGEMENT METHOD FOR LIQUOR CABINET

(71) Applicants:Yu-Chung Lo, Taipei (TW); Kai-Yi Chen, Taipei (TW); Li-Yuan Hsu, Taipei (TW); Yi-Wen Wang, Taipei (TW); Hsiu-Hang Lin, Taipei (TW)

(72) Inventors: Yu-Chung Lo, Taipei (TW); Kai-Yi Chen, Taipei (TW); Li-Yuan Hsu, Taipei (TW); Yi-Wen Wang, Taipei (TW); Hsiu-Hang Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 236 days.

(21) Appl. No.: 16/421,499

(22) Filed: May 24, 2019

(65) Prior Publication Data

US 2020/0128958 A1 Apr. 30, 2020

Related U.S. Application Data

(60) Provisional application No. 62/753,897, filed on Oct. 31, 2018.

(51) Int. Cl.
*G10L 15/22* (2006.01)
*A47B 73/00* (2006.01)

(52) U.S. Cl.
CPC .............. *A47B 73/00* (2013.01); *G10L 15/22* (2013.01); *G10L 2015/223* (2013.01)

(58) Field of Classification Search
CPC .................................................. G06Q 10/087
See application file for complete search history.

(56) References Cited

U.S. PATENT DOCUMENTS

| 8,688,517 B2* | 4/2014 | Lutnick .............. G06Q 30/0209 705/14.4 |
| 8,856,007 B1 | 10/2014 | Stuttle et al. |
| 9,542,933 B2* | 1/2017 | Mortensen .............. G10L 15/22 |

(Continued)

FOREIGN PATENT DOCUMENTS

| CN | 202122318 | 1/2012 |
| CN | 205513393 | 8/2016 |

(Continued)

OTHER PUBLICATIONS

"Office Action of Taiwan Counterpart Application," dated Nov. 20, 2019, p. 1-p. 16.

*Primary Examiner* — Seong-Ah A Shin
(74) *Attorney, Agent, or Firm* — JCIPRNET

(57) ABSTRACT

The disclosure provides a smart liquor cabinet and a management method for the liquor cabinet. In the management method, a voice command is received and an intent of the voice command is determined. If the intent of the voice command is related to a remaining space of the liquor cabinet, then the remaining space with no liquor in the liquor cabinet is determined. If the intent of the voice command is related to an inventory situation of the liquor cabinet, then the inventory situation of stored liquor in the liquor cabinet is determined. The response of the intent is outputted. The response is related to the remaining space or the inventory situation. In this way, the liquor and space in the liquor cabinet may be counted easily and quickly.

24 Claims, 18 Drawing Sheets

(56) References Cited

U.S. PATENT DOCUMENTS

| | | | |
|---|---|---|---|
| 10,068,573 B1 | 9/2018 | Aykac et al. | |
| 10,102,855 B1* | 10/2018 | Sindhwani | G06F 40/169 |
| 2005/0283279 A1* | 12/2005 | Cleeves | G06Q 10/06 |
| | | | 701/1 |
| 2007/0282612 A1* | 12/2007 | Kaneko | H04N 21/42203 |
| | | | 704/275 |
| 2009/0187274 A1* | 7/2009 | Higham | G07C 9/00912 |
| | | | 700/237 |
| 2010/0241963 A1* | 9/2010 | Kulis | G06F 16/685 |
| | | | 715/727 |
| 2011/0163846 A1* | 7/2011 | Bodin | G06Q 20/208 |
| | | | 340/5.92 |
| 2012/0016678 A1* | 1/2012 | Gruber | G06F 9/54 |
| | | | 704/275 |
| 2012/0260683 A1* | 10/2012 | Cheon | F25D 29/00 |
| | | | 62/125 |
| 2016/0012465 A1* | 1/2016 | Sharp | G06Q 20/386 |
| | | | 705/14.17 |
| 2018/0133583 A1* | 5/2018 | Tran | A63B 24/0075 |
| 2018/0233137 A1* | 8/2018 | Torok | G06F 3/167 |
| 2018/0268817 A1* | 9/2018 | Aono | G10L 15/22 |
| 2018/0335252 A1* | 11/2018 | Oh | G06K 9/00771 |
| 2018/0342329 A1* | 11/2018 | Rufo | H04L 12/2812 |
| 2019/0132436 A1* | 5/2019 | Jang | H04W 4/80 |
| 2019/0198018 A1* | 6/2019 | Wang | G10L 15/18 |
| 2019/0279426 A1* | 9/2019 | Musunuri | G06T 19/20 |
| 2019/0279625 A1* | 9/2019 | Huang | G06F 3/04847 |

FOREIGN PATENT DOCUMENTS

| | | |
|---|---|---|
| CN | 206761167 | 12/2017 |
| CN | 108345612 | 7/2018 |
| TW | I235358 | 7/2005 |

\* cited by examiner

SMART LIQUOR CABINET AND MANAGEMENT METHOD FOR LIQUOR CABINET

CROSS-REFERENCE TO RELATED APPLICATION

This application claims the priority benefit of U.S. provisional application Ser. No. 62/753,897, filed on Oct. 31, 2018. The entirety of the above-mentioned patent application is hereby incorporated by reference herein and made a part of this specification.

BACKGROUND OF THE DISCLOSURE

Field of the Disclosure

The disclosure is related to a liquor information providing technique, and more particularly, to a smart liquor cabinet and a management method for the liquor cabinet.

Description of Related Art

Many people regard wine tasting and collecting wine as their interest. Inevitably, these people may need a liquor cabinet to store liquor bottles. There are many kinds of wine, and most people need to know the amount of wine and their quantity by memory, which inevitably leads to mistakes. At this point, the user of the liquor cabinet needs to check the liquor cabinet themselves to know the situation of wine storage and the lack thereof.

SUMMARY OF THE DISCLOSURE

In view of the above, the disclosure provides a smart liquor cabinet and a management method for the liquor cabinet providing a wine inventory service by means of voice interaction.

A smart liquor cabinet of an embodiment of the disclosure includes, but is not limited to, a sound-receiving device, an output device, and a processor. The sound-receiving device is used for receiving a voice command. The output device is used for outputting an information. The processor is coupled to the sound-receiving device and the output device and determines an intent of the voice command. If the intent of the voice command is related to a remaining space of the liquor cabinet, then the processor determines the remaining space with no liquor in the liquor cabinet. If the intent of the voice command is related to an inventory situation of the liquor cabinet, then the processor determines the inventory situation of stored liquor in the liquor cabinet. The processor outputs a response of the intent via the output device. The response is related to the remaining space or the inventory situation of the smart liquor cabinet.

In an embodiment of the disclosure, the response includes an audio data and the output device includes a speaker. The speaker is coupled to the processor. The processor plays the audio data via the speaker.

In an embodiment of the disclosure, the processor generates the audio data according to the remaining space or the inventory situation.

In an embodiment of the disclosure, a content of the audio data is related to reading out the remaining space or the inventory situation.

In an embodiment of the disclosure, the smart liquor cabinet further includes a cabinet body, a cabinet door, and storage elements. The cabinet body has an internal space. The cabinet door is movably disposed at the cabinet body and is used for opening or closing the internal space. The storage elements are disposed at the internal space and are used for storing at least one liquor bottle.

In an embodiment of the disclosure, the response includes a image data and the output device includes a display. The display is coupled to the processor and is used for presenting the image data to the cabinet door.

In an embodiment of the disclosure, the image data is related to prompting the storage elements corresponding to the remaining space or the inventory situation.

In an embodiment of the disclosure, the response includes a light data and the output device includes prompting illumination devices. The prompt illumination devices are coupled to the processor, disposed at the internal space, and respectively correspond to the storage elements. The processor shows a light data through turning on or off the prompting illumination devices.

In an embodiment of the disclosure, a content of the light data is related to presenting the remaining space or the inventory situation.

In an embodiment of the disclosure, the cabinet body is further provided with a horizontal partition for dividing the internal space for two wine types.

In an embodiment of the disclosure, the cabinet body is further provided with a vertical partition for dividing the internal space for wine storage and decanting.

In an embodiment of the disclosure, the smart liquor cabinet further includes a communication transceiver. The communication transceiver is coupled to the processor. The processor is connected to a remote liquor cabinet via the communication transceiver and is used for outputting a response of the intent via the output device and to respond to the remaining space or the inventory situation related to the remote liquor cabinet.

Moreover, a management method for the liquor cabinet of an embodiment of the disclosure includes the following steps. A voice command is received and an intent of the voice command is determined. If the intent of the voice command is related to a remaining space of the liquor cabinet, then the remaining space with no liquor in the liquor cabinet is determined. If the intent of the voice command is related to an inventory situation of the liquor cabinet, then the inventory situation of stored liquor in the liquor cabinet is determined. A response of the intent is outputted.

In an embodiment of the disclosure, the response is related to the remaining space or the inventory situation.

In an embodiment of the disclosure, the determination of the intent of the voice command includes the following steps. A verb command, a question word command, and a first noun command are obtained from the voice command. A preset question word, a preset first verb, a preset second verb, or a preset first noun is accessed.

In an embodiment of the disclosure, after the verb command, the question word command, and the first noun command are obtained from the voice command, the following steps are further included. Whether the question word command matches the preset question word is determined. Whether the first noun command matches the preset first noun when the question word command matches the preset question word is determined.

In an embodiment of the disclosure, after whether the first noun command matches the preset first noun, the following steps are further included. The intent is determined to be related to the remaining space when the first noun command matches the preset first noun.

In an embodiment of the disclosure, after whether the first noun command matches the preset first noun, the following steps are further included. Whether the verb command matches the preset first verb is determined when the first noun command does not match the preset first noun. The intent is determined to be related to the inventory situation when the verb command matches the preset first verb. The intent is determined to be related to the remaining space when the verb command does not match the preset first verb.

In an embodiment of the disclosure, after whether the first noun command matches the preset first noun, the following steps are further included. Whether the verb command matches the preset second verb is determined when the first noun command does not match the preset first noun. The intent is determined to be related to the remaining space when the verb command matches the preset second verb. The intent is determined to be related to the inventory situation when the verb command does not match the preset second verb.

In an embodiment of the disclosure, after the verb command, the question word command, or the first noun command is obtained from the voice command, the following steps are further included. A second noun command is extracted from the voice command. This second noun command is different from the first noun command.

In an embodiment of the disclosure, after the second noun command is extracted from the voice command, the following steps are further included. The remaining space available for a certain wine type is determined when the second noun command matches the wine type. All of the remaining space available for storage in the liquor cabinet is determined when the second noun command does not match the certain wine type.

In an embodiment of the disclosure, after the second noun command is extracted from the voice command, the following steps are further included. The inventory situation of storage of the wine type is determined when the second noun command matches the certain wine type. The inventory situation of all wine types in the liquor cabinet is determined when the second noun command does not match the certain wine type.

In an embodiment of the disclosure, after the verb command, the question word command, and the first noun command are obtained from the voice command, the following steps are further included. The inventory situation related to the intent is determined when the voice command only contains the question word command.

In an embodiment of the disclosure, the response includes an audio data. The output of the response of the intent includes the following steps. One of multiple preset audio data is selected as the audio data. The audio data is played.

A content of the preset audio data is related to reading out the remaining space or the inventory situation.

In an embodiment of the disclosure, the output of the response of the intent includes the following steps. An intent of a second voice command is determined when the second voice command is received. Another of the preset audio data is selected as the audio data if the intent of the second voice command is the same as the intent of the voice command.

In an embodiment of the disclosure, the response includes a visual data. The output of the response of the intent includes the following steps. A storage location is shown on the liquor cabinet via the visual data according to the remaining space or the inventory situation.

In an embodiment of the disclosure, the determination of intent of the voice command includes the following steps. The voice command is converted into a text command. The text command is inputted to a preset machine learning model. The intent and a corresponding entity are determined via the preset machine learning model.

Based on the above, in the smart liquor cabinet and the management method for the liquor cabinet of an embodiment of the disclosure, the intent of a user for liquor cabinet inventory is accepted via voice recognition, and the inventory result of the liquor cabinet is accordingly returned to the user via voice or visual means. In this way, the liquor and space in the liquor cabinet may be counted easily and quickly.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
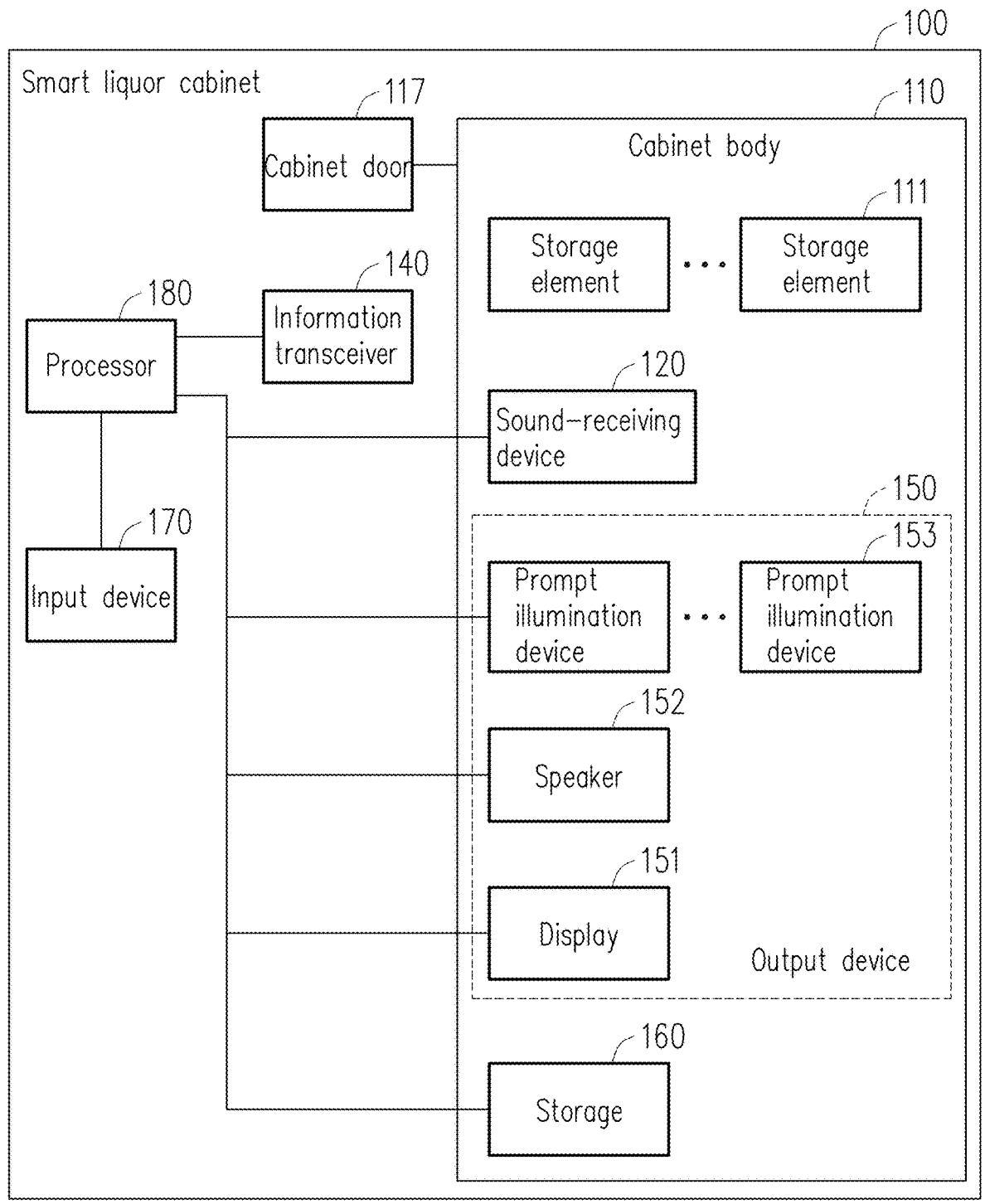
FIG. 1 is a block diagram of elements of a smart liquor cabinet according to an embodiment of the disclosure.

FIG. 1 is a block diagram of elements of a smart liquor cabinet 100 according to an embodiment of the disclosure.

Referring to FIG. 1, the smart liquor cabinet 100 includes, but is not limited to, a cabinet body 110, a voice-receiving device 120, a communication transceiver 140, an output device 150, a storage 160, an input device 170, and a processor 180.

The cabinet body 110 may be of any three-dimensional outer shape and has an internal space. The cabinet body 110 is provided with storage elements 111 (for example, wine trays, wine racks, etc.) for storage of liquor bottles, and the bottles may be fixedly placed on the storage elements 111. It should be noted that the outer shape of the cabinet body 100 and the storage elements 111 may be changed according to actual needs. In some embodiments, the smart liquor cabinet 100 further includes a cabinet door 117, and the cabinet door 117 is movably disposed (e.g., pivoted, via a slide rail, etc.) at the cabinet body 110. The cabinet door 117 may open or close the internal space of the cabinet body 110.

The sound-receiving device 120 may be a device for recording sound such as a microphone or a recorder. In an embodiment of the disclosure, the sound-receiving device 120 is used for receiving a voice command of the user.

The communication transceiver 140 may be a communication device supporting a wired network such as an Ethernet, a fiber network, or a cable network or a wireless network technology such as Wi-Fi, mobile communication, or Bluetooth.

The output device 150 may be a liquid-crystal display (LCD), a light-emitting diode (LED), various types of displays, or other displays 151 that may present a visual picture or light. The output device 150 may also be a speaker 152 or other devices that may make an audible sound. Furthermore, the output device 150 may also be a prompting illumination device 153. The prompt illumination device 153 may be a halogen lamp or an LED light. The prompt illumination device 153 is provided at the internal space of the cabinet body 110, and the prompt illumination device 153 respectively corresponds to one storage element 111.

The storage 160 may be any type of fixed or movable random-access memory (RAM), read-only memory (ROM), flash memory, hard disk drive (HDD), solid-state drive (SSD), or similar elements, and is used to record codes, software modules, inventory situation, remaining space, and other data or files. Detailed description thereof is provided in the embodiments below. In an embodiment of the disclosure, the storage 160 may be used as a local database to facilitate offline data access, and may be connected to the Internet via the communication transceiver 140 to connect to a remote liquor cabinet database (for example, another smart liquor cabinet 100 of the user).

The input device 170 may be a touch panel, a physical knob, a button, a switch, a keyboard, a mouse, or the like, or a combination thereof. The input device 170 may receive a touch command, a rotation command, a press command, a switch command, a function key command, or a slide command, etc., according to the type of the input device 170. In an embodiment of the disclosure, the commands are extended services for liquor bottles, and the details thereof are provided in the following embodiments.

The processor 180 is coupled to the sound-receiving device 120, the communication transceiver 140, the output device 150, the storage 160, and the input device 170. The processor 180 may be a central processing unit (CPU), a microcontroller, a programmable controller, an application-specific integrated circuit (ASIC), a chip, or the like, or a combination of the above elements. In the present embodiment, the processor 180 controls all operations of the smart liquor cabinet 100. For example, the processor 180 receives a voice command via the sound-receiving device 120, analyzes the voice command, and counts the inventory situation and the remaining space in the cabinet body 110. The processor 180 may be connected to the Internet via the communication transceiver 140, make sound, turn on the light, or transmits an image message via the output device 150. In addition, the processor 180 may access the data of the storage 160, or receives an operation command from the user to the input device 170.

Figure 2:
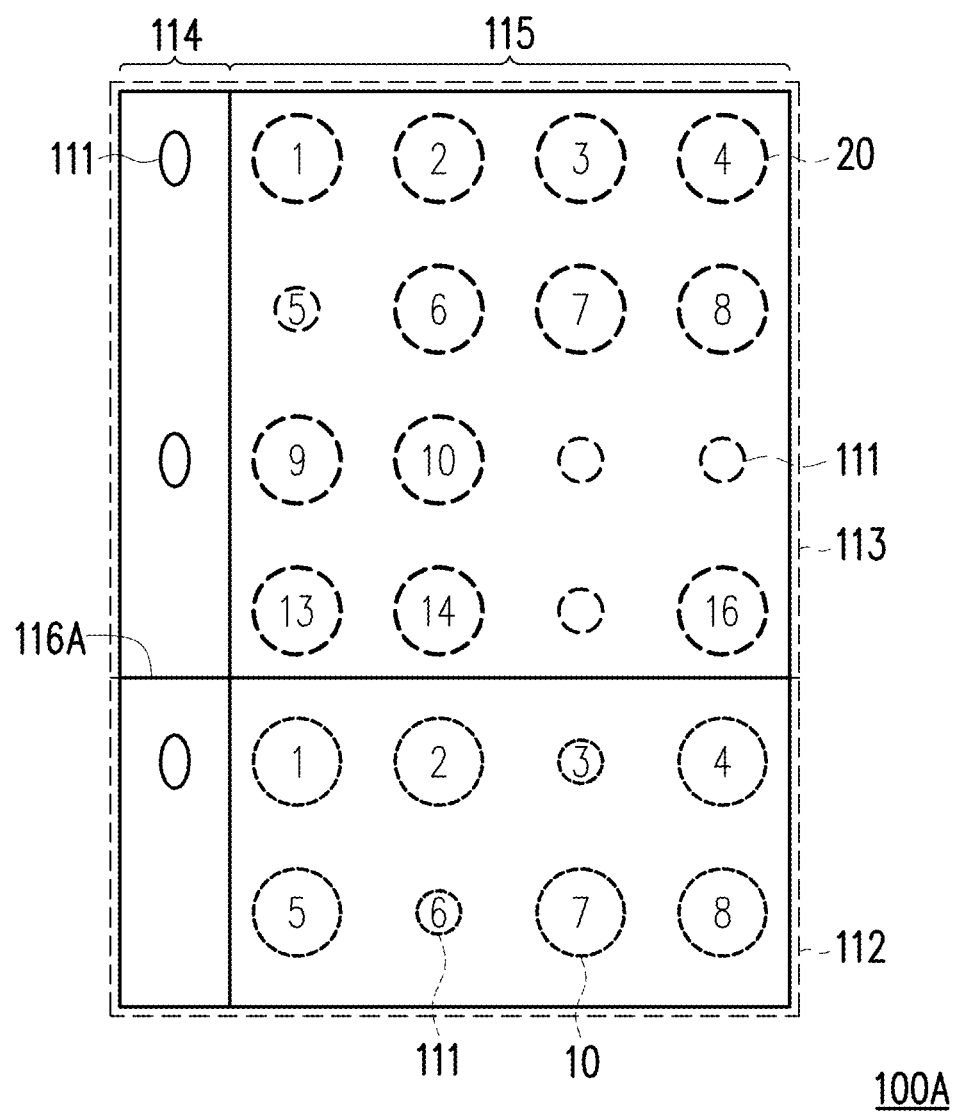
FIG. 2 is a schematic of a smart liquor cabinet according to the first embodiment of the disclosure.

FIG. 2 is a schematic of a smart liquor cabinet 100A according to the first embodiment of the disclosure. Referring to FIG. 2, the cabinet body 110 is further provided with a cross partition 116A (composed of horizontal and vertical partitions). In the longitudinal direction, the internal space is divided into a first area 112 and a second area 113 for use by two different wine types (for example, the first area 112 is stored with a liquor bottle 10 of white wine, and the second area 113 is stored with a liquor bottle 20 of red wine). In the horizontal direction, the internal space is divided into a decantation and sedimentation area 114 and a wine storage area 115 for use in decanting and wine storage. Different temperatures may be provided in the decantation and sedimentation area 114 and the wine storage area 115 of the first area 112 and the second area 113, respectively.

Figure 3:
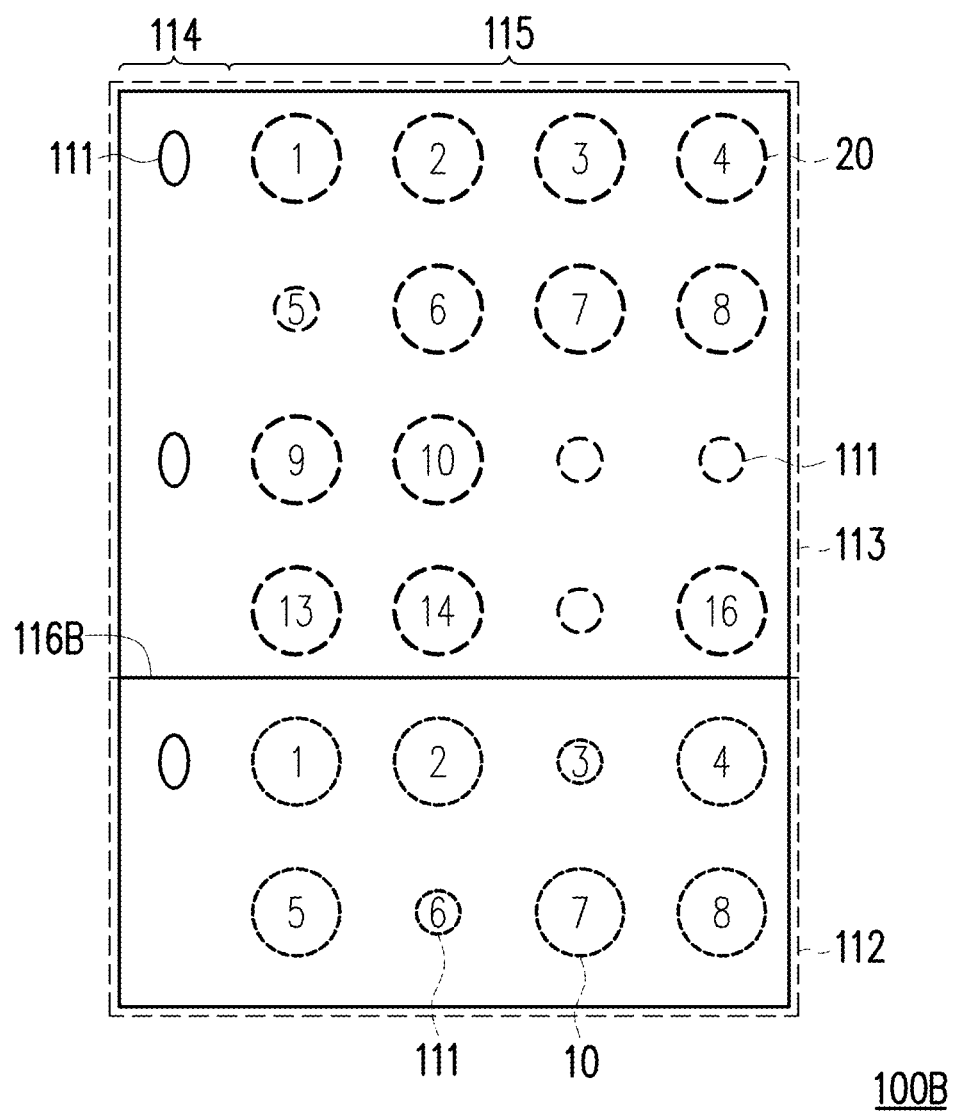
FIG. 3 is a schematic of a smart liquor cabinet according to the second embodiment of the disclosure.

FIG. 3 is a schematic of a smart liquor cabinet 100B according to the second embodiment of the disclosure. Referring to FIG. 3, the difference from the first embodiment shown in FIG. 2 is that the cabinet body 110 of the smart liquor cabinet 100B is provided with a horizontal partition 116B shaped like a straight line. There is no partition between the decantation and sedimentation area 114 and the wine storage area 115 in the first area 112 (i.e., two areas are connected to each other and stored together at the same temperature), and there is no partition between the decantation and sedimentation area 114 and the wine storage area 115 in the second area 113.

Figure 4A:
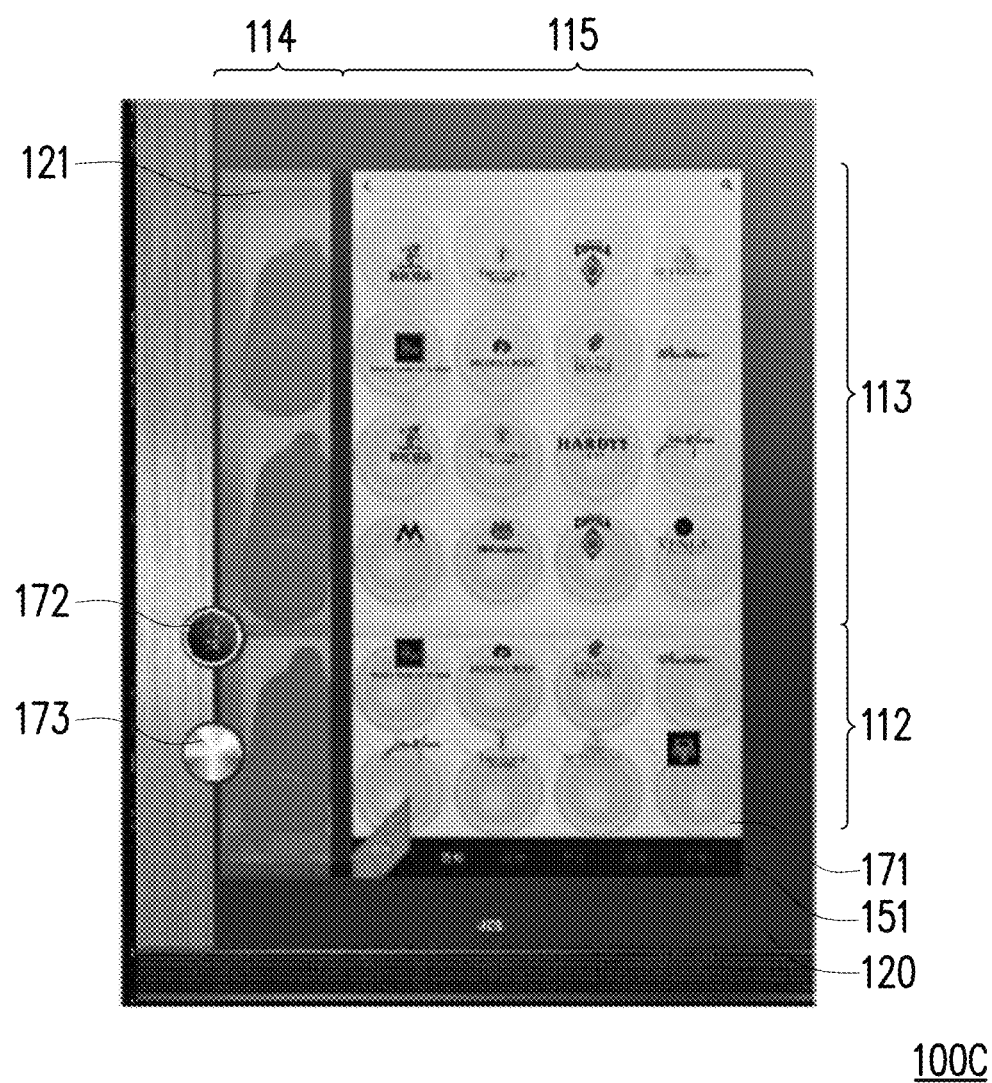
FIG. 4A and FIG. 4B are schematics of a smart liquor cabinet according to the third embodiment of the disclosure.
Figure 4B:
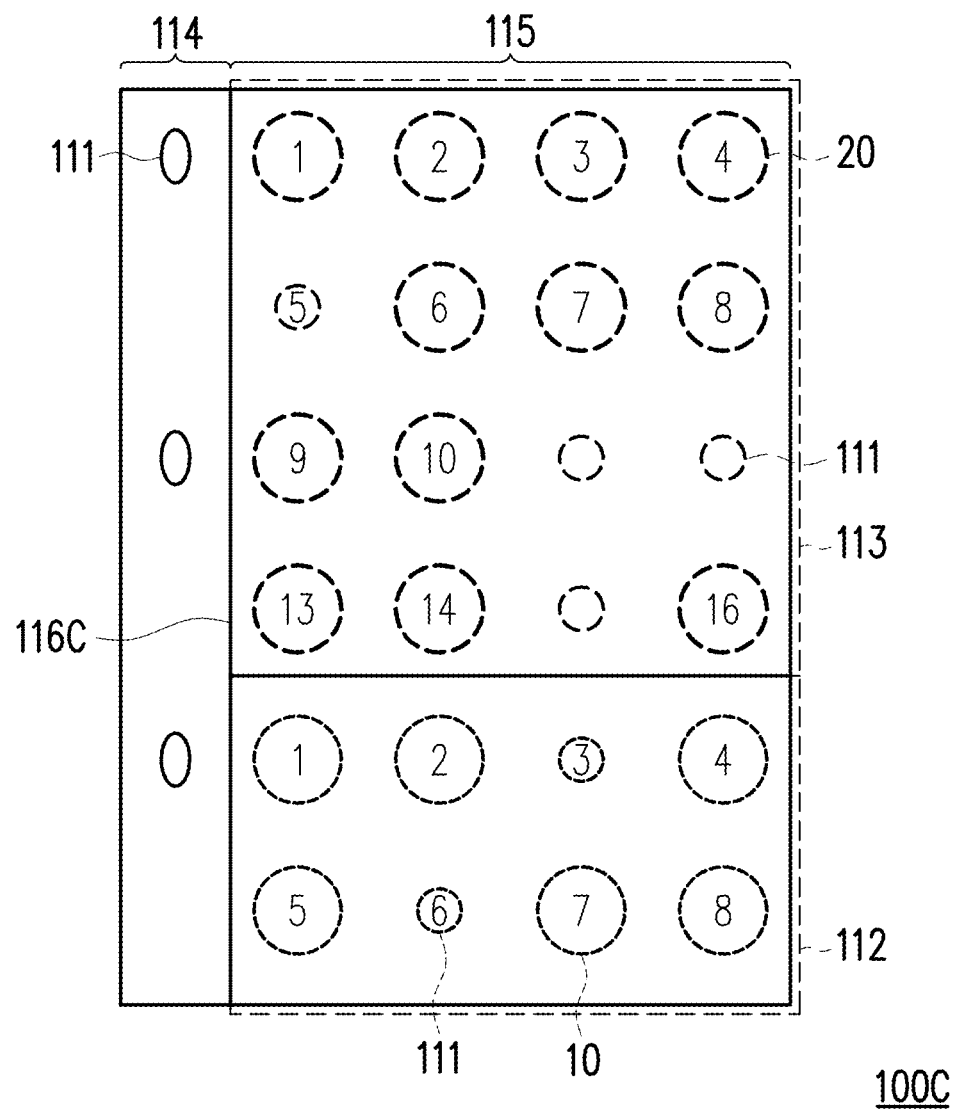

FIG. 4A and FIG. 4B are schematics of a smart liquor cabinet 100C according to the third embodiment of the disclosure. Referring to FIGS. 4A and 4B, the difference from the first embodiment shown in FIG. 2 is that the cabinet body 110 of the smart liquor cabinet 100B is provided with a T-shaped partition 116C (composed of horizontal and vertical partitions). There is no partition in the decantation and sedimentation area 114.

A display 151 and a transparent panel 121 may be disposed on the cabinet door 117. The location and shape of the display 151 correspond to the wine storage area 115, and the location and shape of the transparent panel 121 correspond to the decantation and sedimentation area 114. The display 151 is a transparent display, and some or all of the areas may be adjusted to be transparent or opaque as needed, and the image data is shown at the cabinet door 117. The display 151 may also be combined with a touch panel 171 (i.e., the input device 170) to receive a touch operation of the user. It should be noted that, in other embodiments, the display 151 is not integrated with the cabinet door 117.

In addition, the smart liquor cabinet 100C is further provided with a temperature control function knob 172 and a tasting log function knob 173 (i.e., the input device 170) that are respectively used for adjusting the temperature of the internal space of the cabinet body 110 and showing the image data of a tasting log page on the display 150 in response to the rotation operation of the user. For example, the temperature control function knob 172 is rotated to set the temperature of a specific area to room temperature, 10 to 16° C., 6 to 12° C., the same temperature in different areas, and different temperatures in different areas. The tasting log may be a user feedback information related to the wine type of the liquor bottle.

Figure 5:
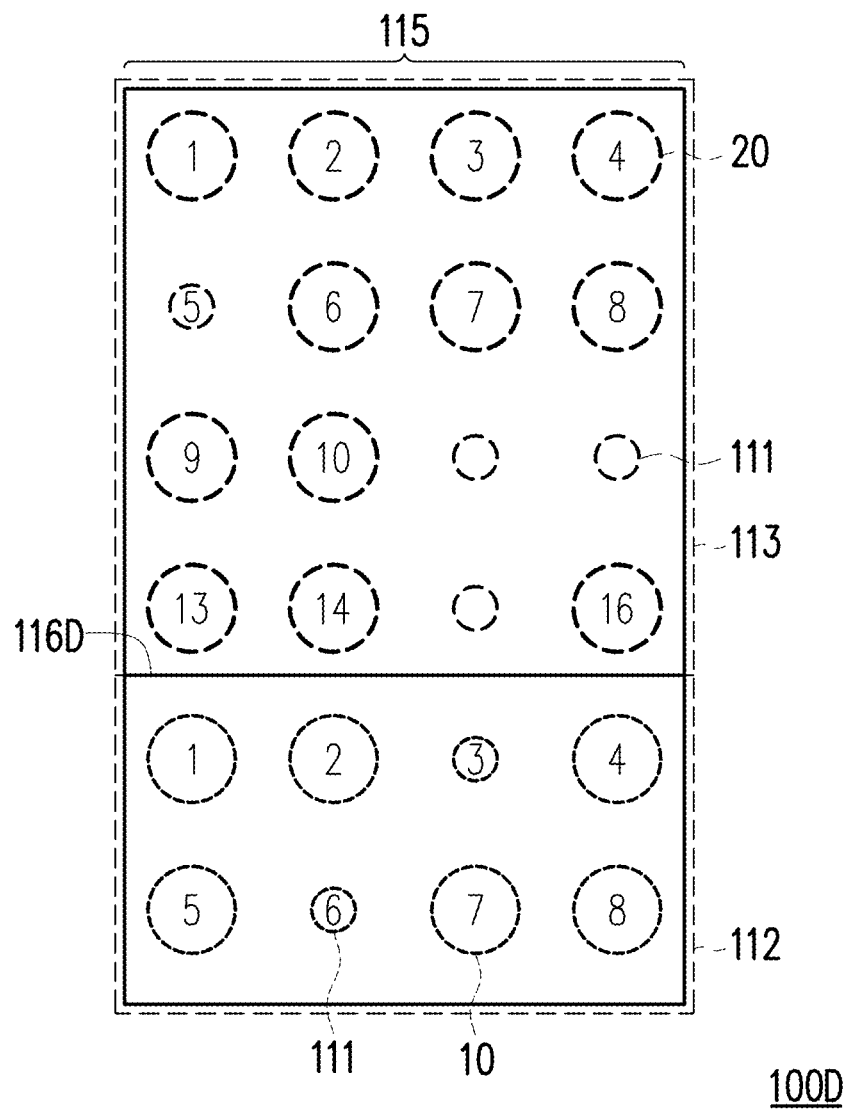
FIG. 5 is a schematic of a smart liquor cabinet according to the fourth embodiment of the disclosure.

FIG. 5 is a schematic of a smart liquor cabinet 100D according to the fourth embodiment of the disclosure. Referring to FIG. 5, the difference from the first embodiment shown in FIG. 2 is that the smart liquor cabinet 100D does not have the decantation and sedimentation area 114 and only has the wine storage area 115.

Figure 6:
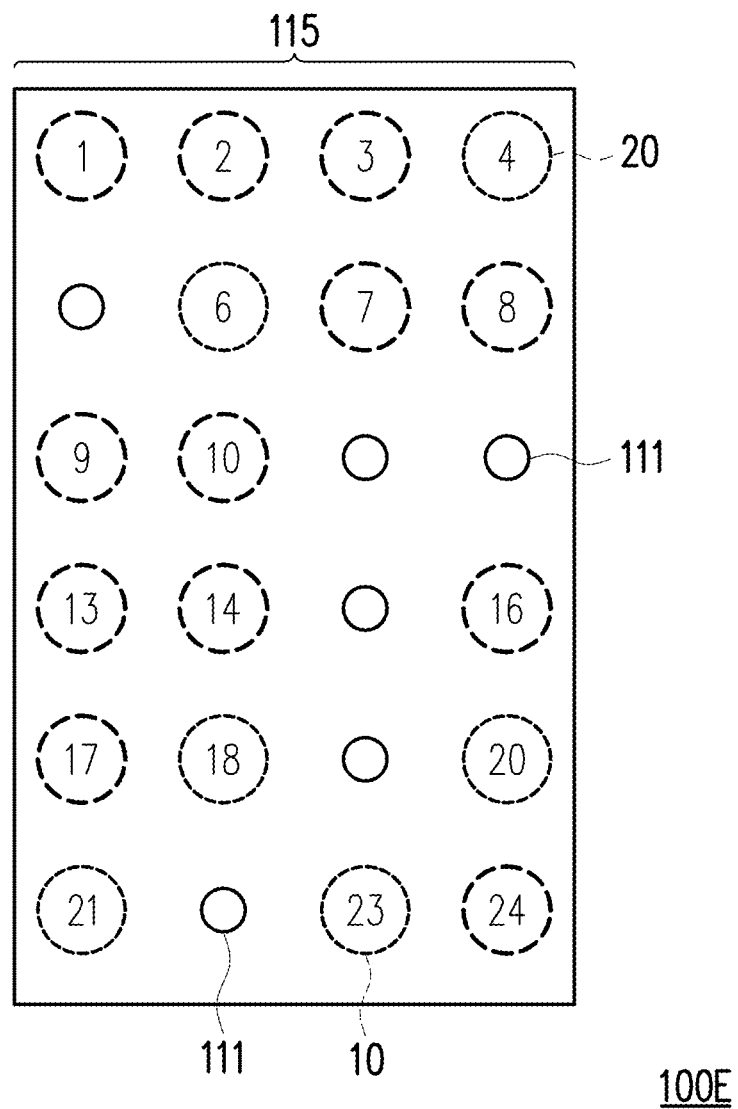
FIG. 6 is a schematic of a smart liquor cabinet according to the fifth embodiment of the disclosure.

FIG. 6 is a schematic of a smart liquor cabinet 100E according to the fifth embodiment of the disclosure. Referring to FIG. 6, the difference from the fourth embodiment shown in FIG. 5 is that no partition is provided in the wine storage area 115. That is, the liquor bottles 10 and 20 of different wine types may be placed on any of the storage elements 111 in the wine storage area 115.

The areas of the first to fifth embodiments are organized as follows, wherein in this case the first area 112 serves as a white wine area and the second area 113 serves as a red wine area:

TABLE (1)

| Embodiments | First | Second | Third | Fourth | Fifth |
|---|---|---|---|---|---|
| Wine storage area | Yes | Yes | Yes | Yes | Yes |
| Red wine area | Yes | Yes | Yes | Yes | No |
| White wine area | Yes | Yes | Yes | Yes | No |
| Decantation and sedimentation area | Yes | Yes | Yes | No | No |
| Red wine area | Yes | Yes | No | No | No |
| White wine area | Yes | Yes | No | No | No |

It should be noted that, according to different design requirements, in other embodiments, the smart liquor cabinet 100 may be provided with more areas or provide placement for different wine types.

With the development of technology, home appliances no longer only provide a single function, and each home appliance has independently developed its own intelligent services. However, the liquor cabinets on the market still only provide temperature control. Liquor cabinet users who have the need to store wine usually do not choose a single wine type, and do not often check on the storage situation in the liquor cabinet. Therefore, if more intelligent functions are provided for the liquor cabinet, it will help the user to obtain more information related to the collected wine.

In order to facilitate the understanding of the operation flow of an embodiment of the disclosure, the flow of the use of the smart liquor cabinet 100 in an embodiment of the disclosure is described in detail below with multiple embodiments. Hereinafter, the method described in an embodiment of the present is described with various devices, elements, and modules in the smart liquor cabinet 100. Each of the processes of the present method may be adjusted according to embodiment conditions and is not limited thereto.

Figure 7:
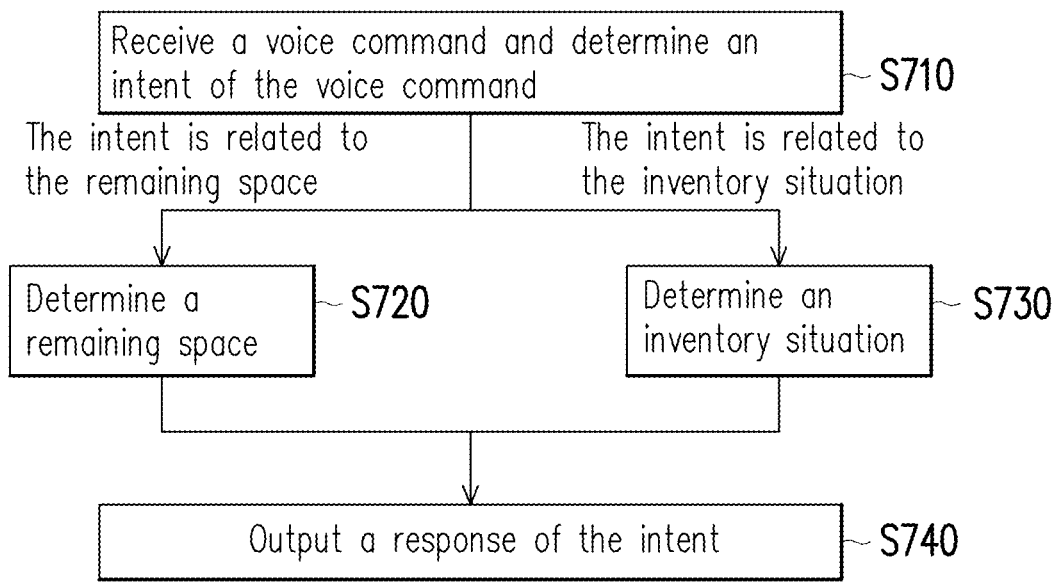
FIG. 7 is a flowchart of a management method for a liquor cabinet according to an embodiment of the disclosure.

FIG. 7 is a flowchart of a management method for a liquor cabinet according to an embodiment of the disclosure. Referring to FIG. 7, the processor 180 receives a voice command and determines an intent of the voice command (step S710). In particular, the voice command is a command for a particular wine type, any wine type, or an inquiry to a bottle photo. The content of the voice command may vary depending on what different people say. The processor 180 may derive the content of the voice command based on a voice recognition technique. The content of the voice command may include a verb command, a noun command, a question word command, or a combination thereof. If the commands parsed from the voice command are analyzed, then the semantics of the user may be understood, thus helping to understand the intent of the user. For example, the processor 180 may convert the voice command into a text command and input the text command to a preset machine learning model. The preset machine learning model is trained by a preset noun, a preset verb, and/or a preset question word. The processor 180 may determine the intent of the user and the corresponding entity via the preset machine learning model. Alternatively, the processor 180 may directly compare the intent of the user and the corresponding entity thereof based on the preset nouns, preset verbs, and/or preset question words recorded in the database. Detailed steps regarding the analysis of the intent are described in detail in the subsequent embodiments.

Figure 8:
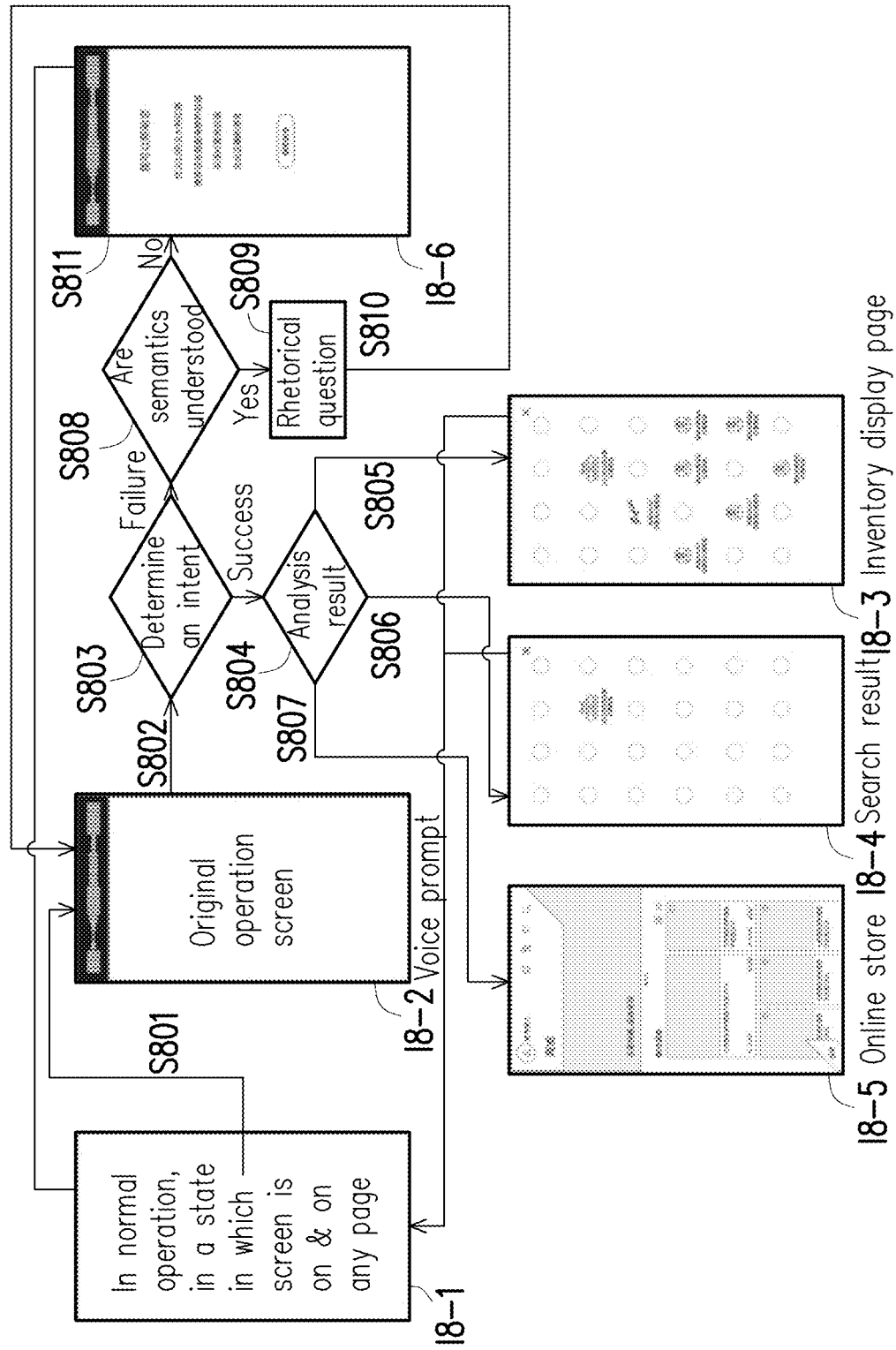
FIG. 8 is a schematic flowchart of a processing method for a voice command according to an embodiment of the disclosure.

FIG. 8 is a schematic flowchart of a processing method for a voice command according to an embodiment of the disclosure. Referring to FIG. 8, a image data I8-1 may be any page on the display 151. The sound-receiving device 120 receives the voice command from the user to activate a voice function (step S801), and a image data I8-2 shows a voice listening animation (as shown at the top of the figure). At this time, the user may further issue a voice command to inquire the smart liquor cabinet 100 (step S802). For example, "How much white wine is there?" The processor 180 determines the intent of the user based on the voice command (step S803). If the analysis for the intent is successful, then the processor 180 obtains an analysis result (step S804) and displays an inventory display page, a search result, or image datas I8-3 to I8-5 of an online store according to the analysis result (steps S805, S806, and S807).

If the analysis for the intent fails, then the processor 180 determines whether or not to understand a part of the semantics in the voice command (step S808). If part of the semantics is understood, then the processor 180 inquires the user via the speaker 152 to confirm the intent thereof (step S809) and returns to the image data I8-2 to continue listening to the voice command (step S810). If not all the semantics are understood, then the image data I8-6 includes an error message (step S811). For example, sorry, I didn't understand. Next, the image data I8-1 is returned.

Figure 9:
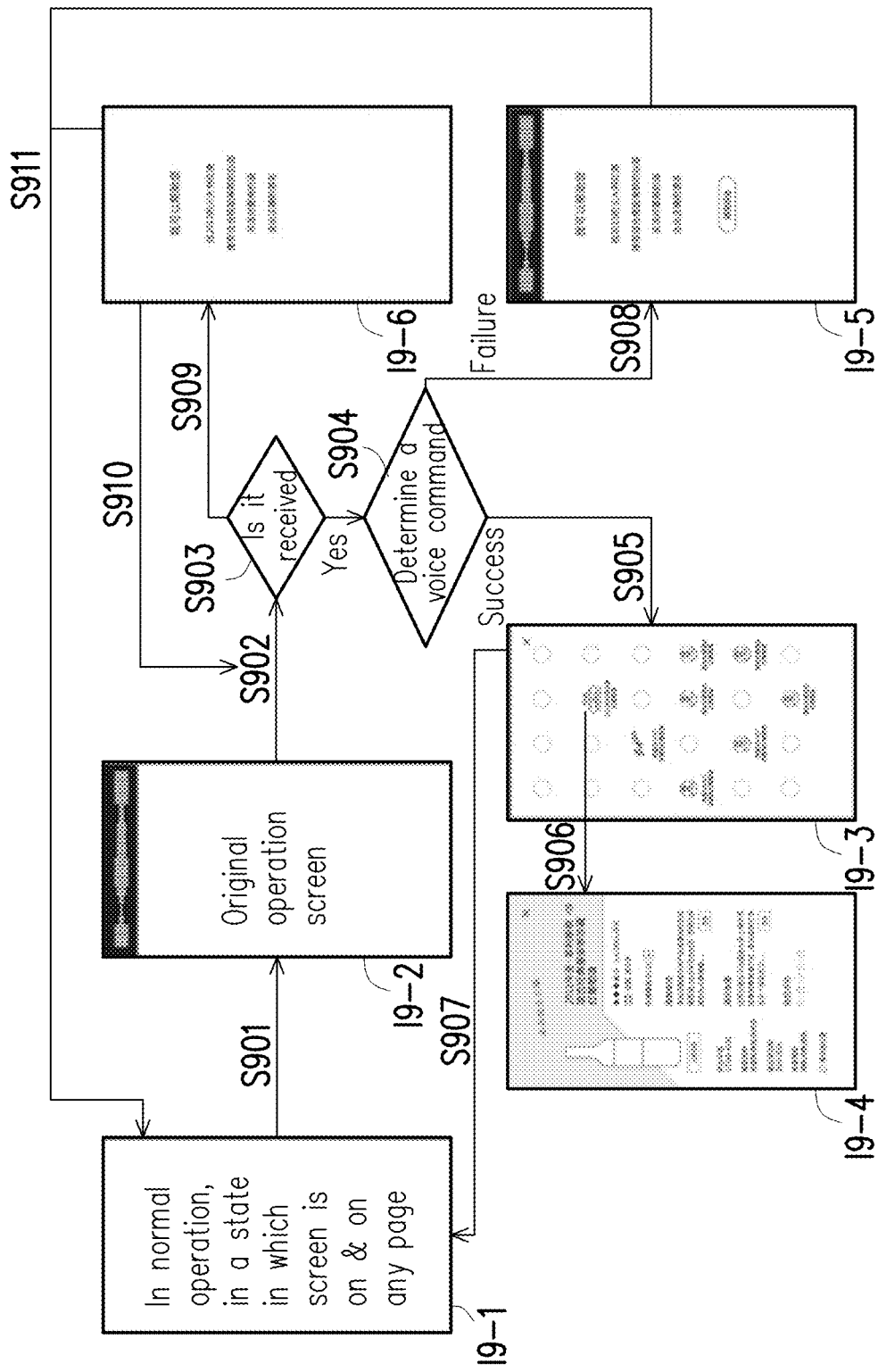
FIG. 9 is a schematic flowchart of a processing method for a voice command according to an embodiment of the disclosure.

FIG. 9 is a schematic flowchart of a processing method for a voice command according to an embodiment of the disclosure. The image data I9-1 may be any page on the display 151. The sound-receiving device 120 receives the voice command from the user to activate a voice function (step S901), and a image data I9-2 shows a voice listening animation (as shown at the top of the figure). At this time, the user may further issue a voice command to inquire the smart liquor cabinet 100 (step S902). For example, "How many bottles of red wine can be placed in the cabinet?" The processor 180 confirms whether the sound-receiving device 120 receives the voice command within a certain time (for example, within 3, 5, or 10 seconds) (step S903).

If the sound-receiving device 120 receives the voice command, then the processor 180 determines the content of the voice command (step S904). If the voice command matches a preset indicating content (i.e., the comparison is successful), then the image data I9-3 may be an inventory display page according to the indicating content (step S905). If the touch panel 171 receives the touch command inputted by the user on the specific wine type on the image data I9-3, then the image data I9-4 provides an introduction page of the selected wine type (step S906). Alternatively, if the touch panel 171 receives the touch command inputted by the user on a close button on the image data I9-3, then the image data I9-1 is returned (step S907). On the other hand, if the voice command does not match the preset indicating content (i.e., the comparison fails), then the image data I9-5 includes an error message, and the speaker 152 may play a message that the voice content is not understood (step S908), and the image data I9-1 is returned (step S911).

Further, if the sound-receiving device 120 does not receive the voice command (step S909), then the image data I9-6 includes an explaining content to assist the user, and the sound-receiving device 120 may try to receive the voice command again (step S910). The user may directly click the close button of the image data I9-6 to return to the image data I9-1 (step S908).

Returning to FIG. 7, an embodiment of the disclosure provides two kinds of counting services, which are respectively inquirying the remaining space and the inventory situation. In an embodiment of the disclosure, the remaining space is related to the number of the storage elements 111 with no liquor bottles stored, and the inventory situation is related to the number of the storage elements 111 with stored liquor bottles. The processor 180 determines whether the intent of the voice command is related to the remaining space or the inventory situation. That is, if the result of the voice comparison is that the intent thereof is related to the remaining space, then the processor 180 counts the number with no liquor bottles stored. If the result of the voice comparison is that the intent thereof is related to the inventory situation, then the processor 180 counts the number with liquor bottles stored.

In an embodiment, the cabinet body 110 may be provided with multiple object detectors (for example, micro switches, pressure sensors, or photo sensors, etc.) respectively corresponding to each of the storage elements 111 to determine whether the liquor bottle is stored in the storage element 111 via an external force or brightness. The object detectors may generate a detection signal depending on whether the liquor bottle is stored or not.

If the result of the voice comparison is that the intent thereof is related to the remaining space, then the processor 180 may learn whether the storage elements 111 are idle according to each detection signal (i.e., a liquor bottle is not placed), and accordingly count all the remaining space of the internal space, the first area 112, or the second area 113 in the cabinet body 110, thereby determining the remaining space (step S720).

On the other hand, if the result of the voice comparison is that the intent thereof is related to the inventory situation, then similarly, the processor 180 may learn whether the storage elements 111 are not idle according to the detection signal of each object detector (i.e., a liquor bottle is placed), and accordingly count all of the inventory situation of the internal space, the first area 112, or the second area 113 in the cabinet body 110 (step S730).

In another embodiment, the display 151 may show a user interface, and receive a new operation of the user for storing wine, a quantity thereof, and a location thereof via a touch panel, or receive an update operation of the user for taking out wine, a quantity thereof, and a location thereof. The processor 180 may learn the remaining space and the inventory situation based on the content of the new operation or the update operation input. For example, the new operation is to add the previously stored quantity for the quantity of a particular wine type, and the update operation is to subtract the previously stored quantity for the quantity of a particular wine type.

In addition, an embodiment of the disclosure is not limited to a single smart liquor cabinet 100. Multiple smart liquor cabinets 100 may be connected via the communication transceiver 140, to obtain the remaining space and the inventory situation of other remote liquor cabinets and sum up or respectively prompt the statistical results and the statistical results of the local liquor cabinet.

Next, the processor 180 outputs a response of the intent via the output device 150 (step S740). This response is a statistical result related to the remaining space or the inventory situation.

In an embodiment, the response is an audio data. The processor 160 generates the audio data based on the statistical result. The content of the audio data is related to reading out the remaining space or the inventory situation. For example, there are 18 liquor bottles in the liquor cabinet, and you may still put 12 bottles of red wine. The processor 160 may then play the audio data via the output device 150 (for example, the speaker 152).

It should be noted that, in order to enrich the content of the response, an embodiment of the disclosure may provide multiple preset audio data for the same intent. The content of the preset audio data is all related to reading out the remaining space or the inventory situation. For example, you have 6 bottles of white wine and 12 bottles of red wine; you have a total of 18 bottles of wine that are 6 bottles of white wine and 12 bottles of red wine; the intent thereof is all targeted to the inventory situation of any type of wine. The processor 180 may select one from the preset audio data for the same intent randomly according to a specific order or weight as an audio data. When the sound-receiving device 120 receives the next second voice command, assuming that the second voice command has the same intent as the previous voice command, the processor 180 may select another one from the preset audio data as the next audio data to be outputted. In this way, the flexibility of the response may be improved without annoying the user.

In another embodiment, the response includes a visual data. The processor 180 may show the storage location on the smart liquor cabinet 100 via a visual data based on the remaining space or the inventory situation. The visual data may vary depending on the type of the output device 150. The output device 150 is exemplified by the display 151, and the image data of the display 151 may be related to prompting the storage elements 111 corresponding to the remaining space or the inventory situation. For example, for the remaining space, the image data visually prompts (showing a particular pattern, color, or flicker) the storage locations corresponding to the storage elements 111 with no liquor bottles stored. Alternatively, for the inventory situation, the image data shows the quantity of the storage elements 111 with no liquor bottles stored.

In addition, the output device 150 is exemplified by the prompt illumination devices 153, and the processor 180 may turn on or off the corresponding prompt illumination devices 153 according to the storage elements 111 corresponding to the remaining space or the inventory situation to show a light data. For example, the processor 180 illuminates the prompt illumination devices 153 corresponding to the storage elements 111 with stored liquor bottles. Alternatively, the processor 180 controls the prompt illumination devices 153 corresponding to the storage elements 111 with no liquor bottles stored to blink. That is, the content of the light data is related to presentation of the storage elements 111 corresponding to the remaining space or the inventory situation.

Figure 10:
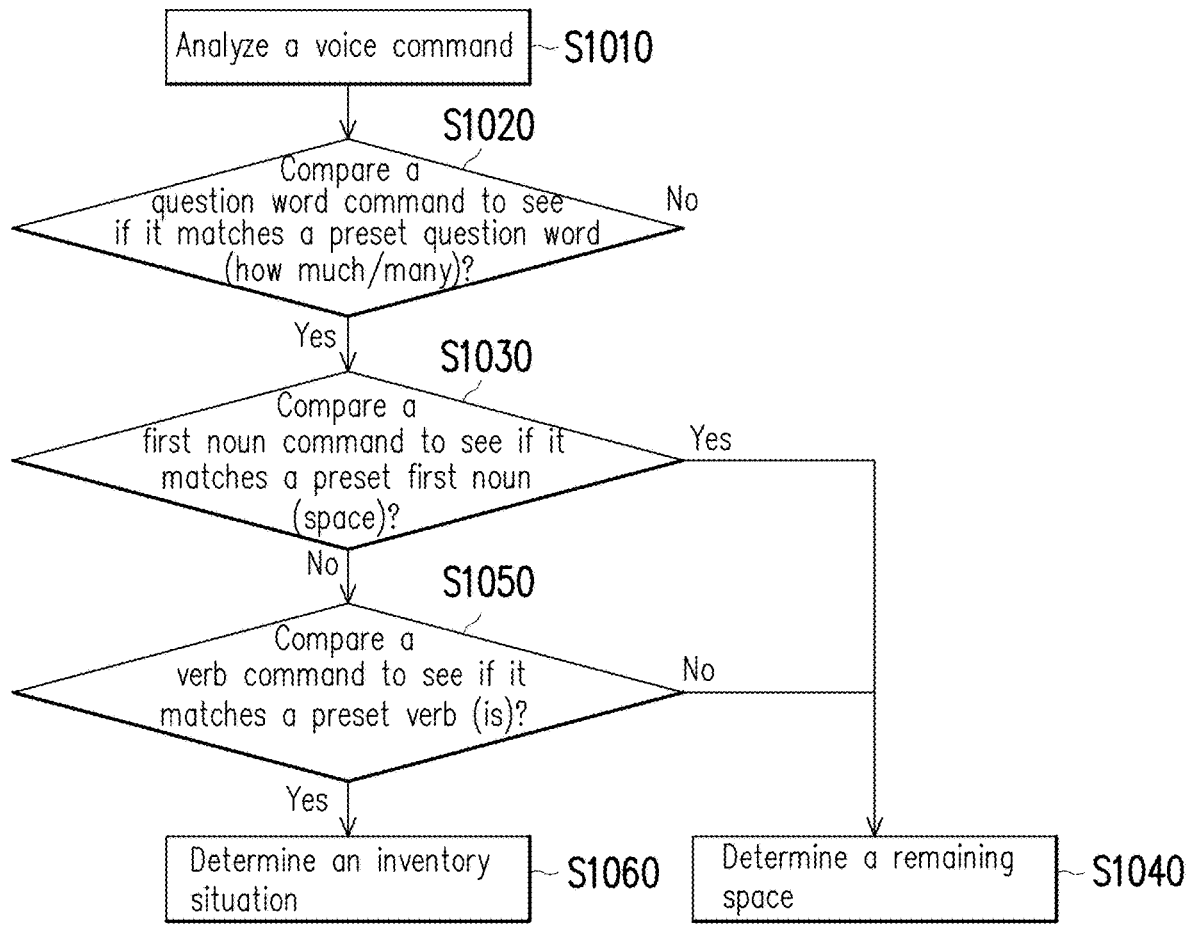
FIG. 10 is a flowchart of a method of analyzing a voice command according to an embodiment of the disclosure.

The analysis of the intent is one of the important technical means of an embodiment of the disclosure, and the following explains in detail how to understand the intent of the user. FIG. 10 is a flowchart of a method of analyzing a voice command according to an embodiment of the disclosure. Referring to FIG. 10, the processor 180 obtains a verb command, a question word command, and/or a noun command from the voice command (step S1010). For example, in the voice command of "How much wine is in the liquor cabinet", the verb command is is, the question word command is how much, and the noun command is liquor cabinet. Next, the processor 180 accesses at least one of a preset verb, a preset question word, and a preset noun.

In an embodiment of the disclosure, the commonly used indicating content is counted, and the voice command is compared according to the indicating content:

TABLE (2)

| Number | Indicating content | Intent | Entity |
|---|---|---|---|
| 1 | How much wine is there in the liquor cabinet | Inventory situation | Wine type: any (for example, red wine, white wine, and other wine types) |
| 2 | How many bottles of wine do I have | Inventory situation | Wine type: any |
| 3 | How much wine is there | Inventory situation | Wine type: any |
| 4 | How many bottles of wine are there | Inventory situation | Wine type: any |
| 5 | How much space is left | Remaining space | Wine type: any |
| 6 | How much usable space is left | Remaining space | Wine type: any |
| 7 | How much space is left | Remaining space | Wine type: any |
| 8 | How much more wine may be stored | Remaining space | Wine type: any |
| 9 | How much red wine is there in the liquor cabinet | Inventory situation | Wine type: red |
| 10 | How many bottles of red wine do I have | Inventory situation | Wine type: red |
| 11 | How much red wine is there | Inventory situation | Wine type: red |
| 12 | How many bottles of red wine are there | Inventory situation | Wine type: red |
| 13 | How much space is left for red wine | Remaining space | Wine type: red |
| 14 | How much space is available for red wine | Remaining space | Wine type: red |
| 15 | How much space is left for red wine | Remaining space | Wine type: red |
| 16 | How much red wine may be stored | Remaining space | Wine type: red |
| 17 | How much white wine is there in the liquor cabinet | Inventory situation | Wine type: white |
| 18 | How many bottles of white wine do I have | Inventory situation | Wine type: white |
| 19 | How much white wine is there | Inventory situation | Wine type: white |
| 20 | How many bottles of white wine are there | Inventory situation | Wine type: white |
| 21 | How much space is left for white wine | Remaining space | Wine type: white |
| 22 | How much space is available for white wine | Remaining space | Wine type: white |
| 23 | How much space is left for white wine | Remaining space | Wine type: white |
| 24 | How much white wine may be stored | Remaining space | Wine type: white |

TABLE (3)

| Number | Preset verb | Preset question word | Preset first noun | Preset second noun |
|---|---|---|---|---|
| 1, 9, 17 | Is | How much | N/A | Wine/red wine/white wine |
| 2, 10, 18 | Are | How many | N/A | Wine/red wine/white wine |
| 3, 11, 19 | Is | How much | N/A | Wine/red wine/white wine |
| 4, 12, 20 | Are | How many | N/A | Wine/red wine/white wine |
| 5, 13, 21 | Left | How much | Space | N/A/red wine/white wine |
| 6, 14, 22 | Is | How much | Space | N/A/red wine/white wine |
| 7, 15, 23 | Is | How much | Space | N/A/red wine/white wine |
| 8, 16, 24 | Store | How much | N/A | Wine/red wine/white wine |

The processor 180 first compares the question word command with the preset question word (for example, how many/how much) and determines whether the two match (step S1020). If the question word command matches the preset question word in the indicating content, then the processor 180 compares the first noun command with the preset first noun (e.g., space) and determines whether the two nouns match (step S1030). In some embodiments, a single voice command may include two different noun commands, so the processor 180 extracts the first and second noun commands from the voice command. For example, the voice command "How much space is available for white wine" includes two noun commands for white wine and space. It should be noted that the embodiments of the disclosure do not limit the order of the first and second noun commands in the voice command.

If the first noun command matches the preset first noun in the indicating content, then the processor 180 regards the intent of the voice command as related to an inquiry of the remaining space in the cabinet body 110 (step S1040). If the first noun command does not match the preset first noun in the indicating content, then the processor 180 compares the verb command with the preset verb (e.g., is/are) and determines whether the two verbs match (step S1050). If the verb command matches the preset verb in the indicating content, then the processor 180 regards the intent of the voice command as related to the inquiry of the inventory situation of storage in the cabinet body 110 (step S1060). If the verb command does not match the preset verb in the indicating content, then the processor 180 regards the intent of the voice command as related to the inquiry of the remaining space (step S1040).

It is to be noted that the first to fourth embodiments are provided with the two areas 112 and 113 for placement of different wine types. Therefore, the intent of the voice command may also indicate a particular wine type.

Figure 11:
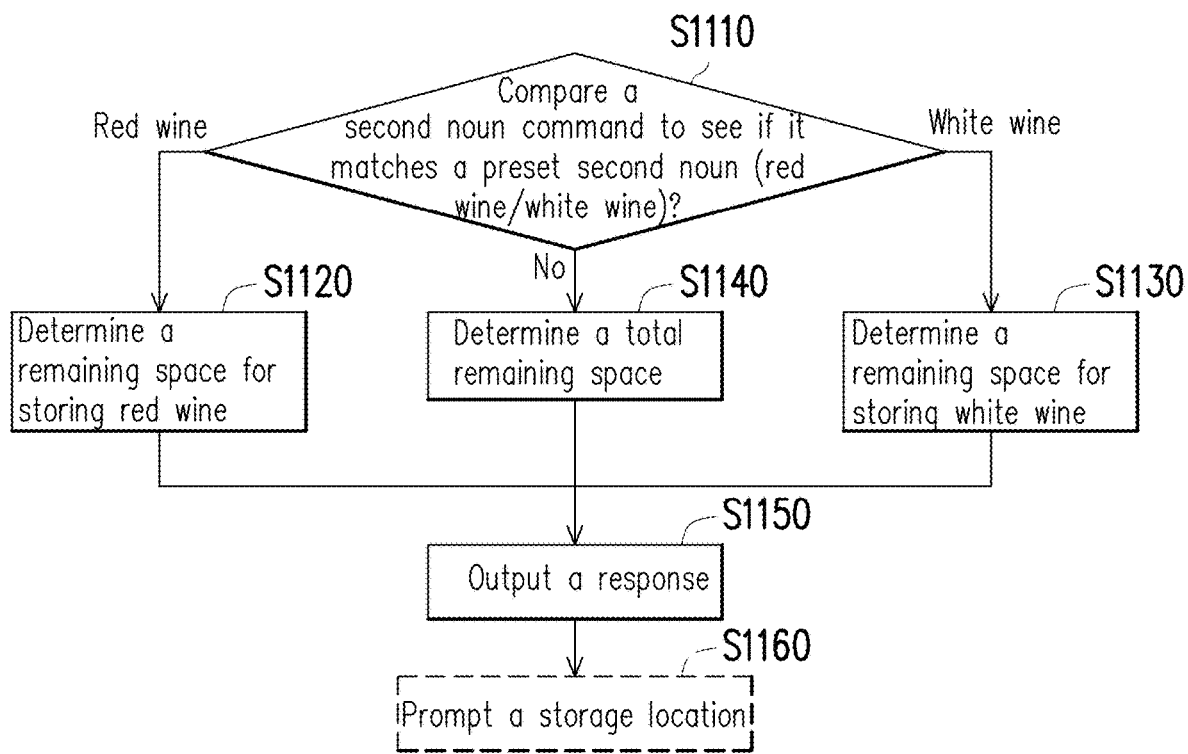
FIG. 11 is a flowchart of a voice command determination method for remaining space according to an embodiment of the disclosure.

FIG. 11 is a flowchart of a voice command determination method for remaining space according to an embodiment of the disclosure. Referring to FIG. 11, if the intent is related to the remaining space, then the processor 180 compares the second noun command with the preset second noun (e.g., red wine/white wine, i.e., a specific wine type), and determines whether the two nouns match (step S1110). If the second noun command matches the red wine, then the processor 180 further limits the intent to the determination of the remaining space for storing red wine (step S1120). For example, the remaining space of the second area 113. If the second noun command matches the white wine, then the processor 180 further limits the intent to the determination of the remaining space for storing white wine (step S1130). For example, the remaining space of the first area 112. If the second noun command does not match the preset second noun (i.e., not restricted to a particular wine type), then the processor 180 further limits the intent to the determination of the remaining space of all wine types in the smart liquor cabinet 100 (step S1140). For example, the remaining space of the wine storage area 115. Next, the processor 180 may count the remaining space of a specified wine type or an unspecified wine type according to the determination result of the intent to generate a response of the intent and output the response via the input device 170 (step S1150).

For the response of the audio data, in order to enrich the flexibility of the response, an embodiment of the disclosure provides multiple response contents for different intents. For example, Table (4) is an example of a response.

TABLE (4)

| Intent | Response |
|---|---|
| Any type of wine, inventory situation | 1. Hello, you have 6 bottles of white wine and 12 bottles of red wine. (serious and strict)<br>2. You have a total of 18 bottles of wine, including 6 bottles of white wine and 12 bottles of red wine. (serious and strict)<br>3. There are currently 18 bottles of wine in the liquor cabinet. (informal) |
| Any type of wine, remaining space | 1. Hello, you may put 6 more bottles of wine. (informal)<br>2. Hello, you may still put 6 bottles of wine, including 2 bottles of white wine and 4 bottles of red wine. (serious and strict)<br>3. You may still put 2 bottles of white wine and 4 bottles of red wine in the liquor cabinet. (serious and strict) |
| Red wine only, inventory situation | 1. Hello, you have 12 bottles of red wine. (congruent)<br>2. You have a total of 12 bottles of red wine. (congruent)<br>3. There are currently 12 bottles of red wine in the liquor cabinet. (congruent)<br>4. Hello, you have 6 bottles of white wine. (incongruent)<br>5. You have a total of 6 bottles of white wine. (incongruent)<br>6. There are currently 6 bottles of white wine in the liquor cabinet. (incongruent) |
| White wine only, remaining space | 1. Hello, you may put 2 more bottles of white wine. (congruent)<br>2. You may put 2 more bottles of white wine in the liquor cabinet. (congruent)<br>3. Hello, you may put 12 more bottles of red wine. (incongruent)<br>4. You may put 12 more bottles of red wine in the liquor cabinet. (incongruent) |

The processor 180 may randomly select any one of the corresponding set of responses in Table (4) as the content of the audio data outputted by the speaker according to the analysis result of the intent.

In an embodiment, the processor 180 may select different response methods according to the weights, so that the user may feel a certain personality from the liquor cabinet. For example, the addition of selection weights of a serious and strict type and an incongruent type may make the user feel that the liquor cabinet is a cheeky steward. This may enhance the fun and create a user experience.

For example, the weights may be divided into: serious and prudent (if the user asks in a very simple manner and the liquor cabinet replies in a very meticulous manner, then the user may feel the liquor cabinet has a serious personality), informal (if the user asks a very detailed question and the liquor cabinet replies in a very simple manner, the user may feel the liquor cabinet has a casual personality), incongruent (the user asks about red wine, but the liquor cabinet responds about white wine, which may make the user feel the liquor cabinet has a playful personality), or congruent (question or response is congruent). The response content in Table (4) is noted to correspond to the weights.

In addition, the processor 180 may also inform the idle location of a stored object 11 (i.e., the location where a liquor bottle is not stored) in a visual manner via the display 151 or the prompt illumination devices 153 (step S1160).

Figure 12:
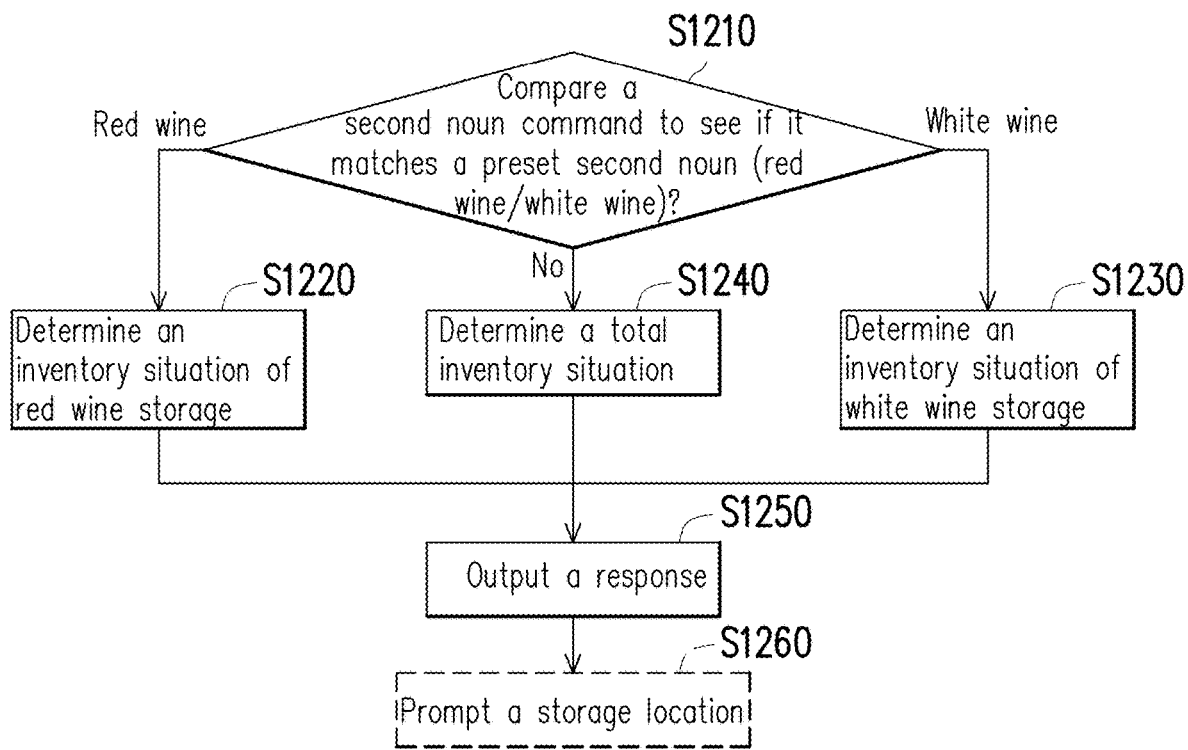
FIG. 12 is a flowchart of a voice command determination method for inventory situation according to an embodiment of the disclosure.

FIG. 12 is a flowchart of a voice command determination method for inventory situation according to an embodiment of the disclosure. Referring to FIG. 12, if the intent is related to the inventory situation, then the processor 180 compares the second noun command with the preset second noun (e.g., red wine/white wine, i.e., a specific wine type), and determines whether the two nouns match (step S1210). If the second noun command matches the red wine, then the processor 180 further limits the intent to the determination of the inventory situation with stored red wine (step S1220). For example, the inventory situation of the second area 113. If the second noun command matches the white wine, then the processor 180 further limits the intent to the determination of the inventory situation with stored white wine (step S1230). For example, the inventory situation of the first area 112. If the second noun command does not match the preset second noun (i.e., not restricted to a particular wine type), then the processor 180 further limits the intent to the determination of the inventory situation of all wine types in the smart liquor cabinet 100 (step S1240). For example, the inventory situation of the wine storage area 115. Next, the processor 180 may count the inventory situation of a specified wine type or an unspecified wine type according to the determination result of the intent to generate a response of the intent and output the response via the output device 150 (step S1250).

The processor 180 may randomly select any one of the corresponding set of responses in Table (4) as the content of the audio data outputted by the speaker according to the analysis result of the intent. In addition, the processor 180 can also inform the storage location of the stored object 11 (i.e., the location where a liquor bottle is stored) in a visual manner via the display 151 or the prompt illumination devices 153 (step S1260).

Figure 13:
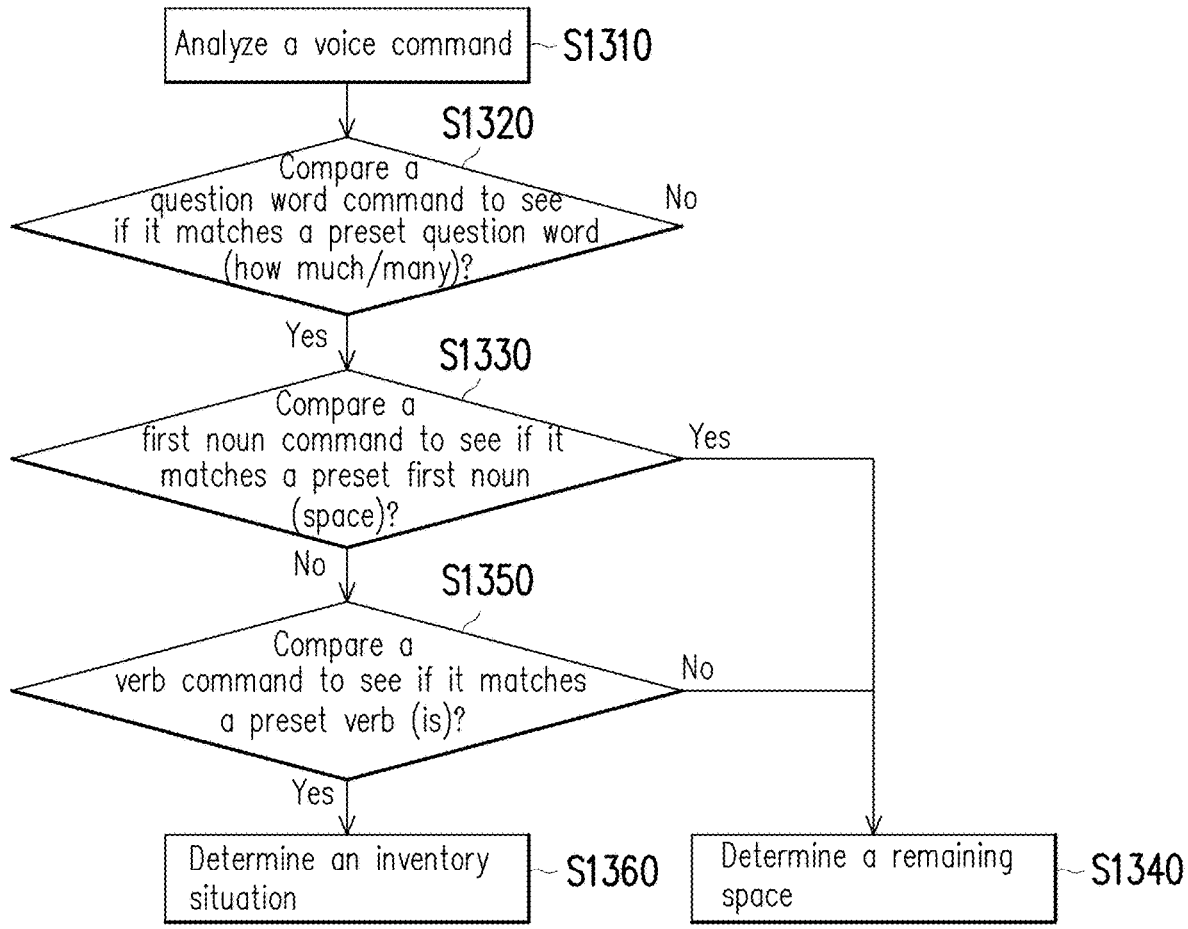
FIG. 13 is a flowchart of a method of analyzing a voice command according to another embodiment of the disclosure.

FIG. 13 is a flowchart of a method of analyzing a voice command according to another embodiment of the disclosure. Referring to FIG. 13, steps S1310 to S1340 and S1360 are respectively as provided in the descriptions of steps S1010 to S1040 and S1060. The difference from the embodiment shown in FIG. 10 is that, if the first noun command does not match the preset first noun in the indicating content, then the processor 180 compares the verb command with the preset second verb (e.g., place) and determines whether the two match (step S1350). If the verb command matches the preset second verb in the indicating content, then the processor 180 regards the intent of the voice command as related to the inquiry of the remaining space (step S1340). If the verb command does not match the preset second verb in the indicating content, then the processor 180 regards the intent of the voice command as related to the inquiry of the inventory situation of storage in the cabinet body 110 (step S1360).

It is to be noted that the wine storage area 115 of the fifth embodiment does not limit the placement location of the wine type. The fifth embodiment is described below.

Figure 14:
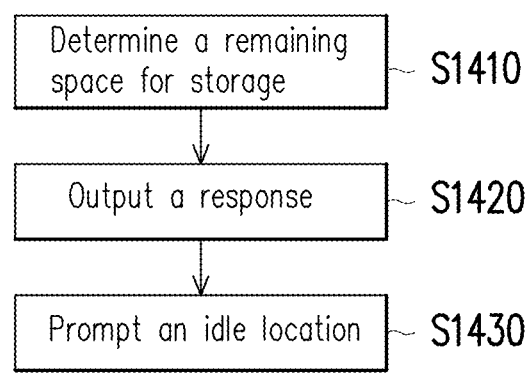
FIG. 14 is a flowchart of a voice command determination method for remaining space according to another embodiment of the disclosure.

FIG. 14 is a flowchart of a voice command determination method for remaining space according to another embodiment of the disclosure. Referring to FIG.

14, steps S1420 and S1430 are respectively as provided in the descriptions of steps S1150 and S1160. The difference from the embodiment shown in FIG. 11 is that if the intent is related to the remaining space, then the processor 180 directly regards the intent as the remaining space for determining all the wine types in the smart liquor cabinet 100 (step S1410). For example, the remaining space of the wine storage area 115.

Figure 15:
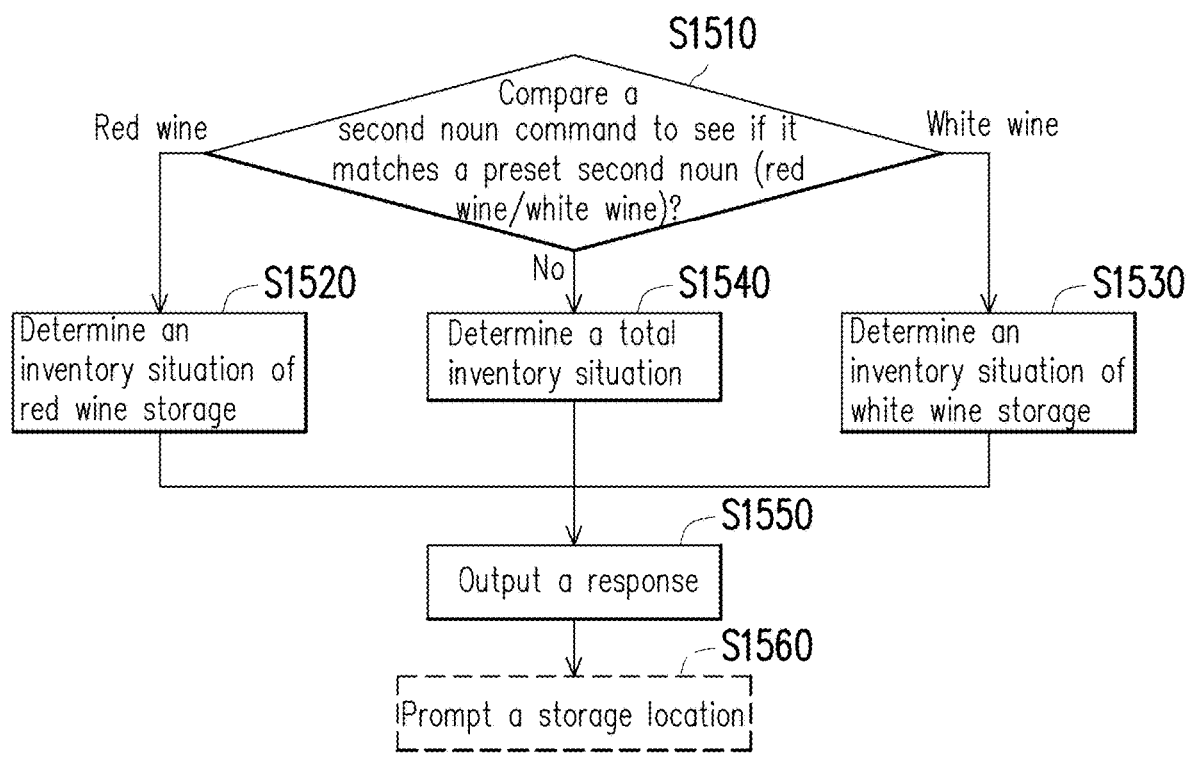
FIG. 15 is a flowchart of a voice command determination method for inventory situation according to another embodiment of the disclosure.

FIG. 15 is a flowchart of a voice command determination method for inventory situation according to another embodiment of the disclosure. Referring to FIG. 15, since the intent of the user may still be related to a specific wine type, steps S1510 to S1560 thereof are as described for steps S1210 to S1260 shown in FIG. 12 and are not repeated herein.

Figure 16A:
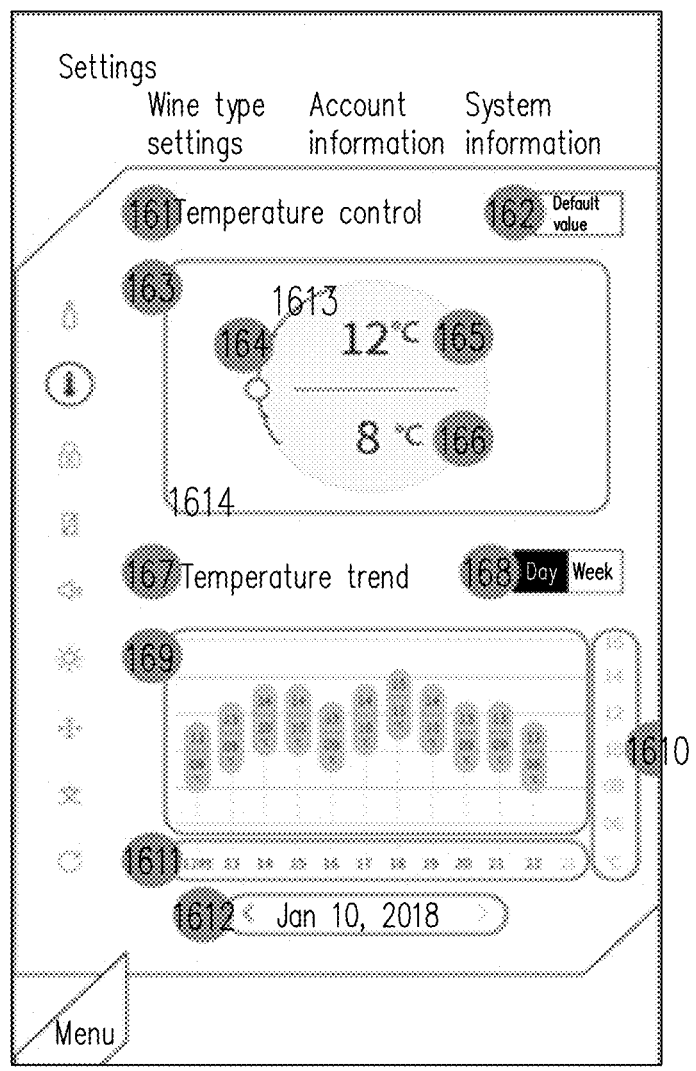
FIG. 16A and FIG. 16B are schematics of temperature control according to an embodiment of the disclosure.
Figure 16B:
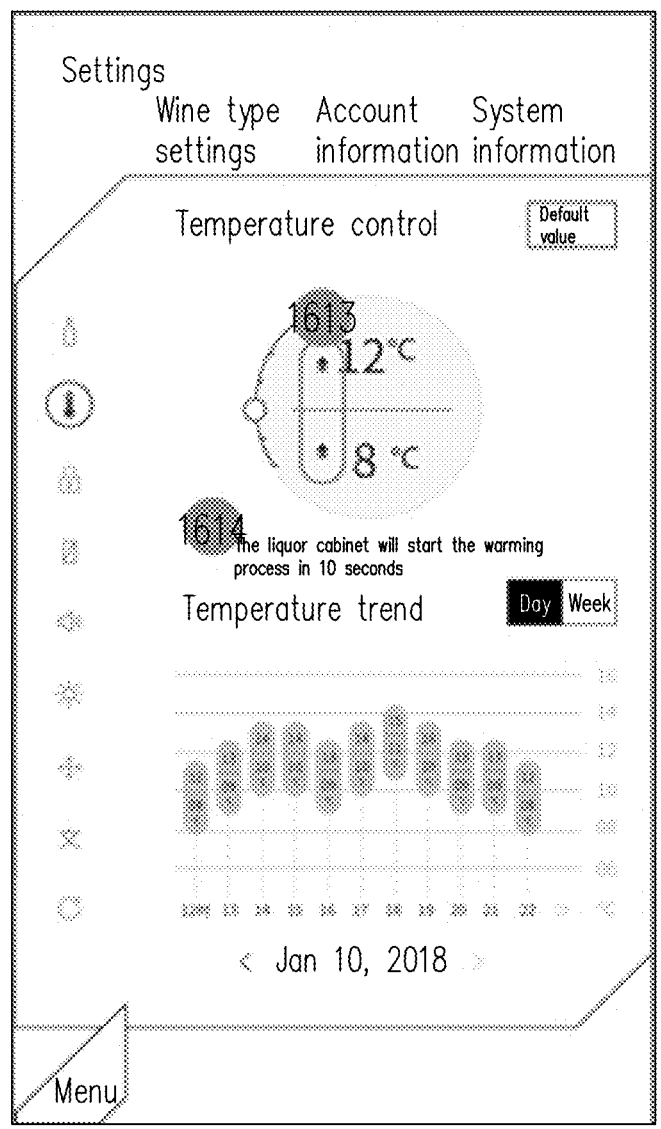

Moreover, different areas in the cabinet body 110 may provide different temperature controls. An embodiment of the disclosure also provides a rich interface for the user to use. FIG. 16A and FIG. 16B are schematics of temperature control according to an embodiment of the disclosure. Referring to FIGS. 16A and 16B, the image data presented by the display 151 may include an item name 161, a default value button 162, a temperature control content 163, a temperature control bar/button 164, a liquor cabinet upper layer temperature 165, a liquor cabinet lower layer temperature 166, a temperature trend title 167, a switch 168, a temperature trend information 169, a temperature unit 1610, a time unit 1611, a time interval 1612, a heating/cooling icon 1613, and a heating/cooling process start countdown prompt 1614.

The item name 161 is used for displaying the currently selected item name (for example, temperature control). The default value button 162 may reset the upper/lower layer temperature setting to a preset value after being clicked by the user, and the upper/lower layers are, for example, the second area 113 and the first area 112. The temperature control content 163 is used for displaying the current actual temperature value and the temperature control bar.

The temperature control bar/button 164 is used for displaying the current temperature placement of the liquor cabinet, and the user may click and slide the placement button to adjust the temperature, i.e., slide up to raise the temperature, and slide down to lower the temperature. There are seven orders of temperature adjustment, the temperature of each order differs by one degree, and the temperature difference from the coldest to the hottest is substantially equal. For example, coldest: 10 degrees in the upper layer and 6 degrees in the lower layer; somewhat cold in the middle: 11 degrees in the upper layer and 7 degrees in the lower layer; middle (preset value): 12 degrees in the upper layer, 8 degrees in the lower layer of the liquor cabinet; somewhat hot in the middle: 13 degrees in the upper layer and 9 degrees in the lower layer; somewhat hot: 14 degrees in the upper layer and 10 degrees in the lower layer; hot: 15 degrees in the upper layer and 11 degrees in the lower layer; hottest: 16 degrees in the upper layer and 12 degrees in the lower layer.

The upper layer temperature 165 is used for displaying the current actual temperature of the upper layer of the liquor cabinet. Under normal conditions, the actual temperature should be equal to the set temperature, and the preset value is 12. The liquor cabinet lower layer temperature 166 is used for displaying the current actual temperature of the lower layer of the liquor cabinet. Under normal conditions, the actual temperature should be equal to the set temperature, and the preset value is 8.

The temperature trend title 167 is used for displaying the title. The switch 168 is slid by the user to change the time unit of the temperature trend (for example, temperature trend information with one day or one week as the period basis). The temperature trend information 169 is used for displaying the temperature information of the liquor cabinet. Each data shows the upper/lower layer temperature. If the temperature of the liquor cabinet is abnormal, then the data is additionally highlighted on the display. For example, the temperature is displayed in words of different colors or flashed. The temperature unit 1610 has a smallest unit of 1° C. located on the vertical axis of the chart, and shows that the temperature range that may be set by the liquor cabinet is 6 to 16° C.

The time unit 1611 is located on the horizontal axis of the chart and displays the corresponding time unit according to the switch. For example, "week" has a unit of Monday to Sunday; "day" has a unit of hour (based on 24 hours), showing 12 hours each time displayed as two segments of 0 to 11 hours/12 to 23 hours. The time interval 1612 is used for displaying the time interval in which the current chart is located, the user clicks the button to switch the time period, and the latest time period data is displayed by default. After "View earlier time period, select" is clicked, the latest time period may be viewed. If the button shows a light color, it means that it is the oldest/latest time period and cannot be switched by clicking.

For the heating/cooling icon 1613, when the temperature adjustment operation of the user is completed, if the set temperature is higher/lower than the current temperature of the liquor cabinet, then the heating/cooling arrow icon is dynamically displayed. For the heating/cooling process start countdown prompt 1614, in order to protect the life of the compressor of the liquor cabinet, the heating/cooling process is started only after a certain number of seconds after the temperature adjustment. The countdown seconds are displayed on the interface, and if the temperature is changed during the countdown, then the countdown is started again after the temperature is changed.

Based on the above, the smart liquor cabinet and the management method for the liquor cabinet of the disclosure determine the intent of the user based on the voice command thereof. An audio or visual response is provided based on the content of the intent (e.g., inventory situation, remaining space, specific wine type, etc.) to inform if a particular storage location within the cabinet body is idle or stored. This makes it easy for the user to understand any storage situation in the liquor cabinet.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A smart liquor cabinet, comprising:
a sound-receiving device, receiving a voice command;
an output device, outputting an information; and
a processor, coupled to the sound-receiving device and the output device, and configured for:
determining an intent of the voice command, comprising extracting a verb command, a question word command, or a first noun command from the voice command;

accessing a preset question word, a preset first verb, a preset second verb, or a preset first noun;

determining whether the question word command matches the preset question word;

determining whether the first noun command matches the preset first noun in response to the question word command matching the preset question word;

determining whether the verb command matches the preset first verb in response to the first noun command not match the preset first noun;

determining the intent is related to a remaining space in response to the verb command matching the preset first verb; and determining the intent is related to an inventory situation in response to the verb command not matching the preset first verb; and outputting a response of the intent via the output device, wherein the response is related to the remaining space or the inventory situation of the smart liquor cabinet.

2. The smart liquor cabinet of claim 1, wherein the response comprises an audio data, and the output device comprises:

a speaker coupled to the processor, and the processor plays the audio data via the speaker.

3. The smart liquor cabinet of claim 2, wherein the processor generates the audio data according to the remaining space or the inventory situation.

4. The smart liquor cabinet of claim 2, wherein a content of the audio data is related to reading out the remaining space or the inventory situation.

5. The smart liquor cabinet of claim 1, further comprising:
a cabinet body, having an internal space;
a cabinet door, movably disposed at the cabinet body for opening or closing the internal space; and
a plurality of storage elements, disposed at the internal space and used for storing at least one liquor bottle.

6. The smart liquor cabinet of claim 5, wherein the response comprises an image data, and the output device comprises:
a display coupled to the processor and disposed on the cabinet door, and the processor shows the image data via the display.

7. The smart liquor cabinet of claim 6, wherein a content of the image data is related to prompting the storage elements corresponding to the remaining space or the inventory situation.

8. The smart liquor cabinet of claim 5, wherein the response comprises a light data, and the output device comprises:
a plurality of prompt illumination devices coupled to the processor, disposed at the internal space and respectively corresponding to the storage elements, and the processor shows the light data through turning on or off the prompt illumination devices.

9. The smart liquor cabinet of claim 8, wherein a content of the light data is related to presenting the remaining space or the inventory situation.

10. The smart liquor cabinet of claim 5, wherein the cabinet body is further provided with a horizontal partition for dividing the internal space for two wine types.

11. The smart liquor cabinet of claim 5, wherein the cabinet body is further provided with a vertical partition for dividing the internal space for wine storage and decanting.

12. The smart liquor cabinet of claim 1, further comprising:
a communication transceiver, coupled to the processor, wherein the processor is connected to a remote liquor cabinet via the communication transceiver and configured for:
outputting the response of the intent via the output device, and the response is related to a remaining space or an inventory situation of the remote liquor cabinet.

13. A management method for a liquor cabinet, comprising:
receiving a voice command and determining an intent of the voice command, comprising:
extracting a verb command, a question word command, or a first noun command from the voice command;
accessing a preset question word, a preset first verb, a preset second verb, or a preset first noun;
determining whether the question word command matches the preset question word;
determining whether the first noun command matches the preset first noun in response to the question word command matching the preset question word;
determining whether the verb command matches the preset first verb in response to the first noun command not match the preset first noun;
determining the intent is related to a remaining space in response to the verb command matching the preset first verb; and
determining the intent is related to an inventory situation in response to the verb command not matching the preset first verb;
determining the remaining space with no liquor in the liquor cabinet in response to the intent of the voice command being related to the remaining space of the liquor cabinet;
determining the inventory situation with stored liquor in the liquor cabinet in response to the intent of the voice command being related to the inventory situation of the liquor cabinet; and
outputting a response of the intent.

14. The management method for the liquor cabinet of claim 13, wherein the response is related to the remaining space or the inventory situation.

15. The management method for the liquor cabinet of claim 13, after the step of determining whether the first noun command matches the preset first noun, the method further comprises:
determining the intent is related to the remaining space in response to the first noun command matching the preset first noun.

16. The management method for the liquor cabinet of claim 13, after the step of determining whether the first noun command matches the preset first noun, the method further comprises:
determining whether the verb command matches the preset second verb in response to the first noun command not match the preset first noun;
determining the intent is related to the remaining space in response to the verb command matching the preset second verb; and
determining the intent is related to the inventory situation in response to the verb command not matching the preset second verb.

17. The management method for the liquor cabinet of claim 13, after the step of extracting the verb command, the question word command, or the first noun command from the voice command, the method further comprises:
  extracting a second noun command from the voice command, wherein the second noun command is different from the first noun command.

18. The management method for the liquor cabinet of claim 17, after the step of extracting the second noun command from the voice command, the method further comprises:
  determining the remaining space available for storing a wine type in response to the second noun command matching the wine type; and
  determining all of the remaining space available for storage in the liquor cabinet in response to the second noun command not matching the wine type.

19. The management method for the liquor cabinet of claim 17, after the step of extracting the second noun command from the voice command, the method further comprises:
  determining the inventory situation for a stored wine type in response to the second noun command matching the wine type; and
  determining the inventory situation of all wine types in the liquor cabinet in response to the second noun command not matching the wine type.

20. The management method for the liquor cabinet of claim 13, after the step of extracting the verb command, the question word command, or the first noun command from the voice command, the method further comprises:
  determining the intent is related to the inventory situation in response to the voice command only contains one question word command.

21. The management method for the liquor cabinet of claim 13, wherein the response comprises an audio data, and the step of outputting the response of the intent comprises:
  selecting one of a plurality of preset audio data as the audio data; and
  playing the audio data.

22. The management method for the liquor cabinet of claim 21, wherein a content of the preset audio data is related to reading out the remaining space or the inventory situation.

23. The management method for the liquor cabinet of claim 21, wherein the step of outputting the response of the intent comprises:
  determining an intent of a second voice command in response to the second voice command being received;
  selecting another one of the preset audio data as the audio data in response to the intent of the second voice command being the same as the intent of the voice command.

24. The management method for the liquor cabinet of claim 13, wherein the response comprises a visual data, and the step of outputting the response of the intent comprises:
  presenting a storage location on the liquor cabinet via the visual data according to the remaining space or the inventory situation.

* * * * *